United States Patent
Park et al.

(10) Patent No.: US 9,491,004 B2
(45) Date of Patent: Nov. 8, 2016

(54) METHOD AND APPARATUS FOR PROVIDING SERVICE USING USER IDENTIFICATION IN WIRELESS COMMUNICATION SYSTEM

(75) Inventors: Yun-Sang Park, Suwon-si (KR); Byung-Duck Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 1554 days.

(21) Appl. No.: 12/187,077

(22) Filed: Aug. 6, 2008

(65) Prior Publication Data

US 2009/0042544 A1 Feb. 12, 2009

(30) Foreign Application Priority Data

Aug. 8, 2007 (KR) .................. 10-2007-0079350

(51) Int. Cl.
*H04W 4/00* (2009.01)
*H04L 12/58* (2006.01)

(52) U.S. Cl.
CPC ........... *H04L 12/5895* (2013.01); *H04L 51/38* (2013.01); *H04L 12/5835* (2013.01); *H04L 51/066* (2013.01)

(58) Field of Classification Search
CPC .......... H04W 4/00–4/003; H04W 4/12–4/206
USPC ............... 455/412.1, 412.2, 466, 413, 414.1, 455/414.4, 422.1, 426.1, 426.2, 432.2, 455/550.1, 552.1, 553.1, 556.1, 556.2; 379/67.1, 88.05, 88.07–88.09, 88.1, 379/88.11–88.14; 370/310.2, 328, 338, 370/351–356, 349, 389, 496, 522
See application file for complete search history.

(56) References Cited

U.S. PATENT DOCUMENTS

| | | | |
|---|---|---|---|
| 6,304,753 B1 * | 10/2001 | Hartmaier .................. | 455/413 |
| 7,024,209 B1 * | 4/2006 | Gress et al. ................ | 455/466 |
| 7,133,687 B1 * | 11/2006 | El-Fishawy et al. ........ | 455/466 |
| 2005/0064883 A1 * | 3/2005 | Heck et al. ................. | 455/466 |
| 2005/0193133 A1 * | 9/2005 | Niemi .................. | H04L 12/589 |
| | | | 709/230 |
| 2005/0232402 A1 * | 10/2005 | Greve ........................ | 379/88.22 |
| 2006/0280165 A1 * | 12/2006 | Blumenschein et al. ..... | 370/352 |
| 2007/0249379 A1 * | 10/2007 | Bantukul ................ | H04W 4/12 |
| | | | 455/466 |
| 2007/0254681 A1 * | 11/2007 | Horvath et al. ............ | 455/466 |
| 2007/0291927 A1 * | 12/2007 | Batni et al. ................ | 379/372 |
| 2008/0004051 A1 * | 1/2008 | Sylvain .................... | 455/466 |

FOREIGN PATENT DOCUMENTS

KR 1020050081844 8/2005

* cited by examiner

*Primary Examiner* — San Htun
(74) *Attorney, Agent, or Firm* — The Farrell Law Firm, P.C.

(57) ABSTRACT

A method and apparatus for providing a service from a voice-service dedicated terminal to a data-service dedicated terminal by using user identification information of a mobile terminal user in a wireless communication system are provided. The method includes generating a message including an identification of a receiving-side terminal and a service type of the message, and transmitting the generated message to a service server.

12 Claims, 4 Drawing Sheets

METHOD AND APPARATUS FOR PROVIDING SERVICE USING USER IDENTIFICATION IN WIRELESS COMMUNICATION SYSTEM

PRIORITY

This application claims priority under 35 U.S.C. §119(a) to a Korean patent application filed in the Korean Intellectual Property Office on Aug. 8, 2007 and assigned Serial No. 2007-79350, the contents of which are incorporated herein by reference.

BACKGROUND OF THE INVENTION

1. Field of the Invention

The present invention relates generally to a method and apparatus for providing a service in a wireless communication system, and more particularly to a method and apparatus for providing a service from a voice-service dedicated terminal to a data-service dedicated terminal by using user identification information of a mobile terminal user in a wireless communication system.

2. Description of the Related Art

Mobile terminals have increasingly become necessities in modern society for people of all ages. Thus, service providers and terminal manufacturers have been developing various products and services associated with mobile terminals.

For example, the mobile terminal has developed into a multimedia device capable of providing various services such as phonebooks, games, short messages, e-mails, wake-up calls, Motion Picture Experts Group (MPEG)-1 Audio Layer 3 (MP3) players, digital cameras, and wireless Internet services. Video communication services in addition to text and voice services are now available due to the advance of information communication technologies including the Internet.

When a user of the mobile terminal endeavors to perform a call connection, the user inputs a recipient's telephone number to request the connection. According to the request, the wireless communication system recognizes the recipient by using the telephone number and establishes a communication channel with the recognized recipient. Thus, the call connection is established.

In an environment where a voice-service dedicated wireless communication system (e.g., a cellular system) and a data-service dedicated wireless communication system (e.g., a Worldwide interoperability for Microwave Access (Wi-MAX), an EVolution Data Only (EVDO), and a Long Term Evolution (LTE)) co-exist, a user of the voice-service dedicated system establishes a communication channel with a recipient by using a telephone number as described above, and thereafter delivers a service to a receiving-side user.

The user of the data-service dedicated system generally uses a Network Address Identification (NAI) for identification. Thus, the user of the system can access to a specific website and deliver a service to the receiving-side user who uses the voice-service dedicated system.

However, there has been a problem in that the user of the voice-service dedicated system cannot provide the service to the user of the data-service dedicated system.

In order to solve this problem, many techniques have been developed by service providers. For example, there is a known technique in which a server provides a call connection request or an incoming session of a caller according to the request of a recipient when the recipient registers reception information by using an application in a desired format.

However, when using this technique, services such as a Short Message Service (SMS) and a Multimedia Message Service (MMS) cannot be provided from the voice-service dedicated terminal to the data-service dedicated terminal that uses a data-service dedicated identification (e.g., the NAI).

Accordingly, there is a need for a method and apparatus for solving the aforementioned problem arising when using a wireless communication system.

SUMMARY OF THE INVENTION

An aspect of the present invention is to solve at least the above-mentioned problems and/or disadvantages and to provide at least the advantages described below. Accordingly, an aspect of the present invention is to provide a method and apparatus for providing a service from a voice-service dedicated terminal to a data-service dedicated terminal.

An aspect of the present invention is to provide a method and apparatus for establishing a communication link to a data-service dedicated terminal by using an NAI in a voice-service dedicated terminal.

An aspect of the present invention is to provide a method and apparatus for providing a service to a data-service dedicated terminal by evaluating service type information included in a message received from a voice-service dedicated terminal.

In accordance with the present invention, a method of providing a service from a voice-service dedicated terminal to a data-service dedicated terminal includes generating a message including an identification of a receiving-side terminal and a service type of the message, and transmitting the generated message to a service server.

In accordance with the present invention, a method of providing a service from a service server to a data-service dedicated terminal includes receiving a message from a voice-service dedicated terminal, obtaining an identification of a receiving-side terminal and a service type of the message by reading the message, and transmitting the message to a message-processing server corresponding to the obtained service type of the message.

In accordance with the present invention, a method of providing a service in a wireless communication system includes providing the service by a voice-data dedicated terminal by generating a message including an identification of a receiving-side terminal and a service type of the message and by transmitting the message to a service server, and providing the service by the service server by obtaining the identification of the receiving-side terminal and the service type of the message by reading the message and by transmitting the message to a message processing server corresponding to the obtained service type of the message.

In accordance with the present invention, an apparatus for providing a service from a voice-service dedicated terminal to a data-service dedicated terminal includes a message generator for generating a message including an identification of a receiving-side terminal and a service type of the message, and a controller for transmitting the generated message to a service server.

In accordance with the present invention, an apparatus for providing a service from a service server to a data-service dedicated terminal includes a message reader for reading a message received from a voice-service dedicated terminal and for evaluating an identification of a receiving-side terminal and a service type of the message, and a controller for transmitting the message to a message processing server corresponding to the obtained service type of the message.

In accordance with the present invention, an apparatus for providing a service in a wireless communication system includes a voice-data dedicated terminal for generating a message including an identification of a receiving-side terminal and a service type of the message and for transmitting the message to a service server, and the service server for obtaining the identification of the receiving-side terminal and the service type of the message by reading the message and for transmitting the message to a message processing server corresponding to the obtained service type of the message.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE PREFERRED EMBODIMENTS

The following description with reference to the accompanying drawings is provided to assist in a comprehensive understanding of the preferred embodiments of the invention as defined by the claims and their equivalents. Descriptions of well-known functions and constructions will be omitted for the sake of clarity and conciseness.

Hereinafter, a method and apparatus for delivering a service from a voice-service dedicated terminal to a data-service dedicated terminal will be described. For the purpose of explanation, an apparatus and method for the voice-service dedicated terminal and for a service server for controlling the service will be distinctively described. The service can include a voice call service and a message service. The message service will be explained as an example in the following description.

Figure 1:
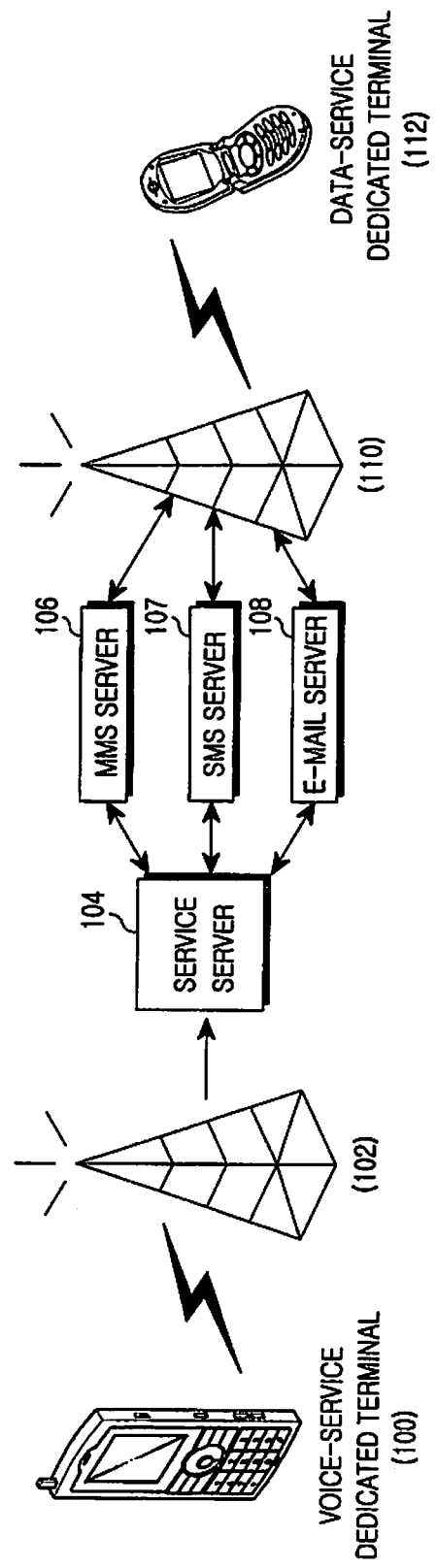
FIG. 1 illustrates a wireless communication system according to the present invention.

FIG. 1 illustrates a structure of a wireless communication system according to the present invention.

It is assumed herein that the wireless communication system operates in an environment where a cellular system and WiMAX, an EVDO, and LTE system co-exist.

Referring to FIG. 1, when a user of a voice-service dedicated terminal 100 transmits a message to a user of a data-service dedicated terminal 112, the voice-service dedicated terminal 100 is connected to a service server 104 via a Base Station (BS) 102.

The connection to the service server 104 denotes a process for transmitting a message from the voice-service dedicated terminal 100 to the service server 104, wherein the message includes user identification information (e.g., an NAI) of a user who uses a receiving-side terminal (i.e., the data-service dedicated terminal 112) and service type information (e.g., a Short Message Service (SMS), a Multimedia Message Service (MMS), a voice message service or an e-mail service).

Upon receiving the message, the service server 104 reads the received message and obtains the user identification information of the user of the receiving-side terminal 112 and the service type information.

Thereafter, the service server 104 transmits a message of a service corresponding to the obtained information to a corresponding server selected from among message servers 106, 107 and 108. The selected message server transmits the message to the receiving-side terminal 112 via a BS 110 supporting data services.

For example, upon receiving from the voice-service dedicated terminal 100 a message including a service type of "MMS", the service server 104 transmits the received message to the MMS server 106.

Accordingly, the MMS server 106 receives the message and transmits the message to the data-service dedicated terminal 112 of the receiving side.

Figure 2:
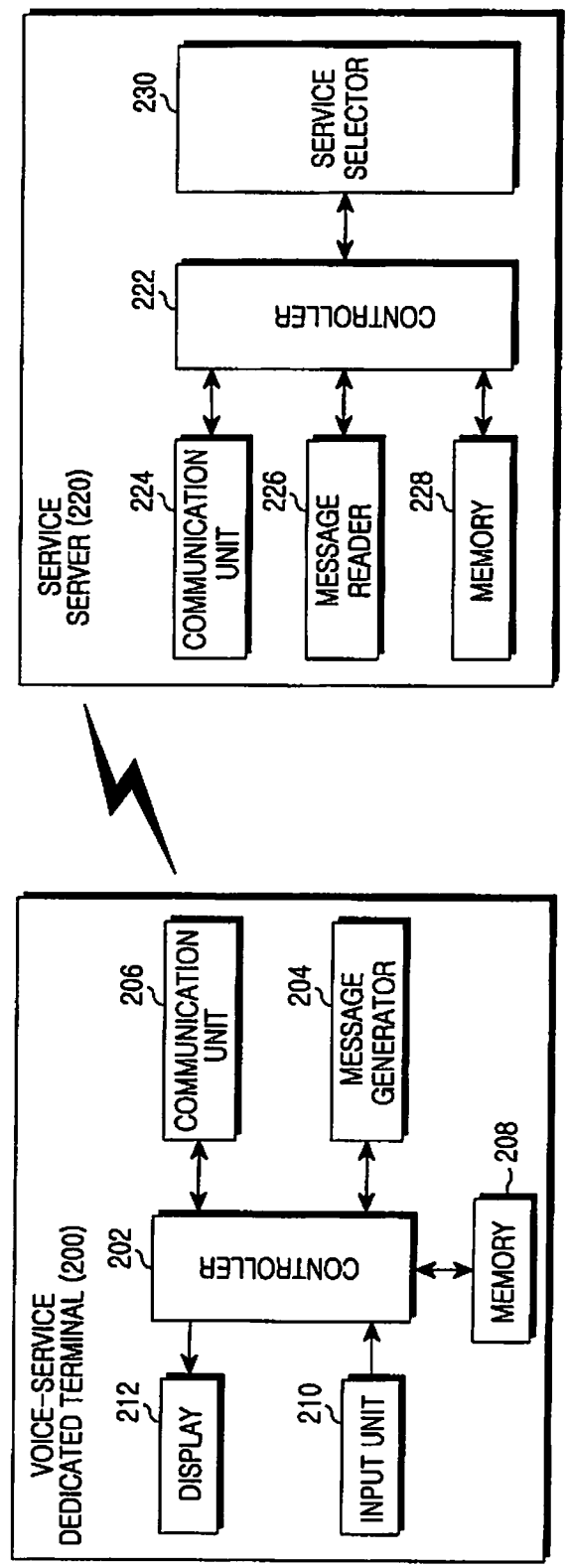
FIG. 2 illustrates a wireless communication system for providing a service by using user identification information of a transmitted message according to the present invention.

FIG. 2 illustrates a wireless communication system for providing a service by using user identification information of a transmitted message according to the present invention.

Referring to FIG. 2, the wireless communication system includes a voice-service dedicated terminal 200, a service server 220 and a data-service dedicated terminal (not shown). Since operations of the voice-service dedicated terminal 200 and the service server 220 are a primary aspect of the present invention, detailed descriptions of the data-service dedicated terminal will be omitted for the sake of conciseness.

The voice-service dedicated terminal 200 includes a controller 202, a message generator 204, a communication unit 206, a memory 208, an input unit 210 and a display 212. The controller 202 provides overall control to the mobile terminal. For example, voice call or data communication is processed and controlled by the controller 202. Further, in addition to a general operation, the controller 202 controls the message generator 204 to generate a message for providing a service to the data-service dedicated terminal.

When the message is generated, the controller 202 receives receiving-side user identification information (e.g., a NAI) and service type information (e.g., an SMS, an MMS, a voice message service or an e-mail service) from a user of the voice-service dedicated terminal 200 as an input. Then, the controller 202 controls the message generator 204 to generate a message including the input information.

Thereafter, the controller 202 transmits the message generated by the message generator 204 to the service server 220.

The message generator 204 generates the message including the receiving-side user identification information and the service type information under the control of the controller 202. For example, the message generator 204 can generate a message by adding the service type information to the receiving-side user identification information.

The memory 208 includes a Read Only Memory (ROM), a Random Access Memory (RAM) and a flash ROM. The ROM stores a microcode of a program, by which the controller 202 and the message generator 204 are processed and controlled, and a variety of reference data.

The RAM is a working memory of the controller 202 and stores temporary data that is generated while programs are performed. The flash ROM stores rewritable data, such as phonebook entries and outgoing and incoming messages.

The input unit 210 includes a plurality of function keys such as numeral key buttons of '0' to '9', and a button for menu, cancel (or delete), confirm, talk, end, Internet access, navigation (or direction), and character input. Key input data (e.g., a request to generate messages), which is input when the user presses these keys, is provided to the controller 202.

The display 212 displays information such as state information, limited numeral characters and large-sized moving and still pictures, which are generated while the mobile terminal (i.e., the voice-service dedicated terminal 200) operates. The display 212 may be a color Liquid Crystal Display (LCD).

The communication unit 206 transmits/receives a Radio Frequency (RF) signal of data that is input/output through an antenna (not shown). For example, in a transmitting process, data to be transmitted is subject to a channel-coding process and a spreading process, and then the data is transformed to an RF signal. In a receiving process, the RF signal is received and transformed to a base-band signal, which is subject to a de-spreading process and a channel-decoding process, thereby restoring the data. According to the present invention, the communication unit 206 transmits the message generated by the message generator 204 to the service server 220.

The message generator 204 may operate under the control of the controller 202 of the mobile terminal 200. Although these elements 204 and 202 are separately configured in the present invention, this separate configuration is for explanation purposes only. Thus, those with ordinary skilled in the art will understand that various modifications can be made within the scope of the present invention. Therefore, in a practical implementation, the message generator 204 may be controlled by the controller 202.

The service server 220 includes a controller 222, a memory 228, a message reader 226, a communication unit 224 and a service selector 230.

The controller 222 provides overall control to the service server 220. In addition to a general operation, when a message is received from the voice-service dedicated terminal 200, the controller 222 controls the message reader 226 to obtain receiving-side user identification information and service type information included in the message.

The controller 222 transmits the received message to a corresponding message server for processing the received message among the message servers 106, 107 and 108.

For example, if the message received from the voice-service dedicated terminal 200 is "tgajh79@sms.wimax", the controller 222 transmits the message to the SMS server 107. Then, the SMS server 107 transmits the message to a receiving-side terminal that uses a user identification of "tgajh79".

The memory 228 stores a microcode of a program, by which the controller 222 and the message reader 226 are processed and controlled, and a variety of reference data.

Under the control of the controller 222, the message reader 226 reads the message received from the voice-service dedicated terminal 220. Then, the message reader 226 obtains the service type information and the user identification information of the receiving-side terminal and provides the obtained information to the controller 222.

If the message received from the voice-service dedicated terminal is "tgajh79@sms.wimax", the message reader 226 can obtain a user identification of "tgajh79" and a service type of "SMS".

In the same manner, if the received message is "tgajh79@mms.wimax", the message reader 226 can obtain a user identification of "tgajh79" and a service type of "MMS".

The communication unit 224 of the service server 220 establishes a communication link to the voice-service dedicated terminal 200, receives a message from the voice-service dedicated terminal 200, and transmits the received message to a corresponding message server among the message servers 106, 107 and 108.

The function of the message reader 226 may be performed by the controller 222 of the service server 220. Although these elements 226 and 222 are separately configured in the present invention, this separate configuration is for explanation purposes only. Thus, in a practical implementation, the message reader 226 may be controlled by the controller 202.

Figure 3:
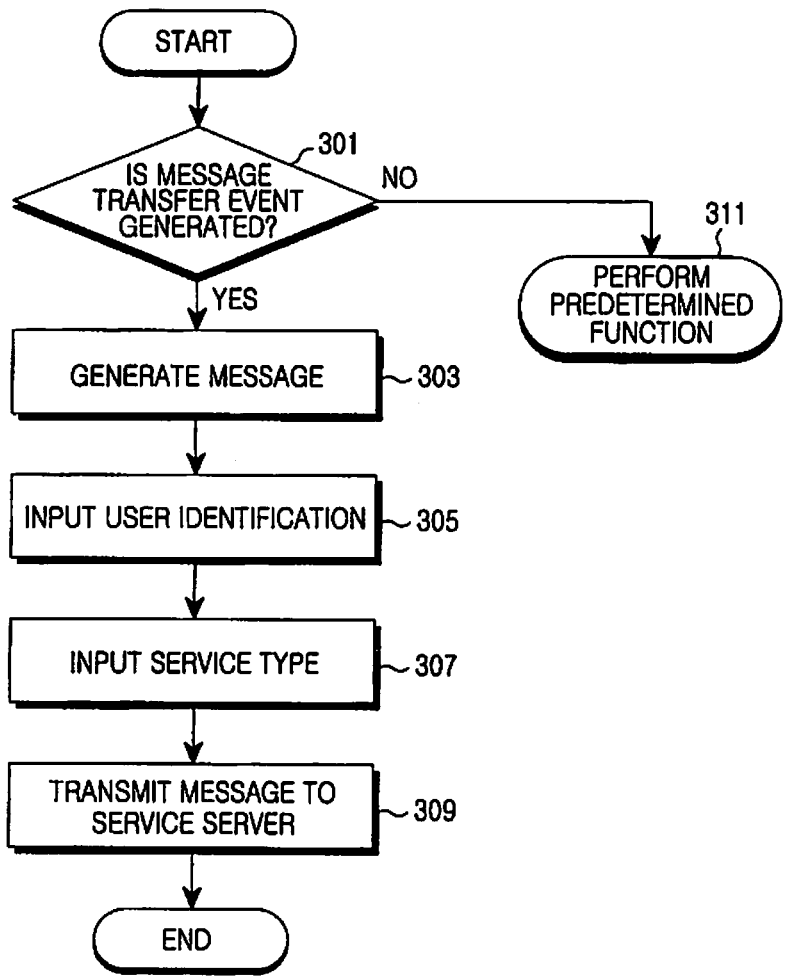
FIG. 3 illustrates a process of a voice-service dedicated terminal for transmitting a message to a data-service designated terminal according to the present invention.

FIG. 3 illustrates a process of a voice-service dedicated terminal for transmitting a message to a data-service designated terminal according to the present invention.

Referring to FIG. 3, the controller 202 of the voice-service dedicated terminal 200 determines whether a message transfer event is generated by a user in step 301.

If the message transfer event is not generated, the controller 202 performs a predetermined function (e.g., a standby mode) in step 311.

Otherwise, if the message transfer message is generated, the controller 202 performs a message generation process in step 303, in which a message to be transmitted to the data-service dedicated terminal is generated. The message may be an SMS message, an MMS message, a voice message or an e-mail message.

The controller 202 receives user identification information from the user of the mobile terminal 200 in step 305, and receives service type information in step 307.

The user identification information is an identification (e.g., an NAI) of the user of the data-service dedicated terminal and indicates information of the receiving-side terminal for receiving the message, that is, information of the data-service dedicated terminal.

The process of receiving the service type information in step 307 is a process in which the user of the mobile terminal selects a message type of a message to be transmitted to the receiving-side terminal (i.e., the data-service dedicated terminal).

In step 309, the controller 202 controls the message generator 204 to generate a message to be transmitted to the receiving-side terminal, and transmits the message to the service server 220.

In this step, the controller 202 can control the message generator 204 to generate a message including message service information and user identification information of a recipient for receiving the message. For example, under the control of the controller 202, the message generator 204 may generate a message of "tgajh79@sms.wimax" when an SMS message is transmitted or may generate a message of "tgajh79@mms.wimax" when an MMS message is transmitted. Further, the controller 202 may generate a voice message in the format of "tgajh79@voice.wimax" or may generate an e-mail message in the format of "tgajh79@mail.wimax".

Thereafter, the procedure of FIG. 3 ends.

Figure 4:
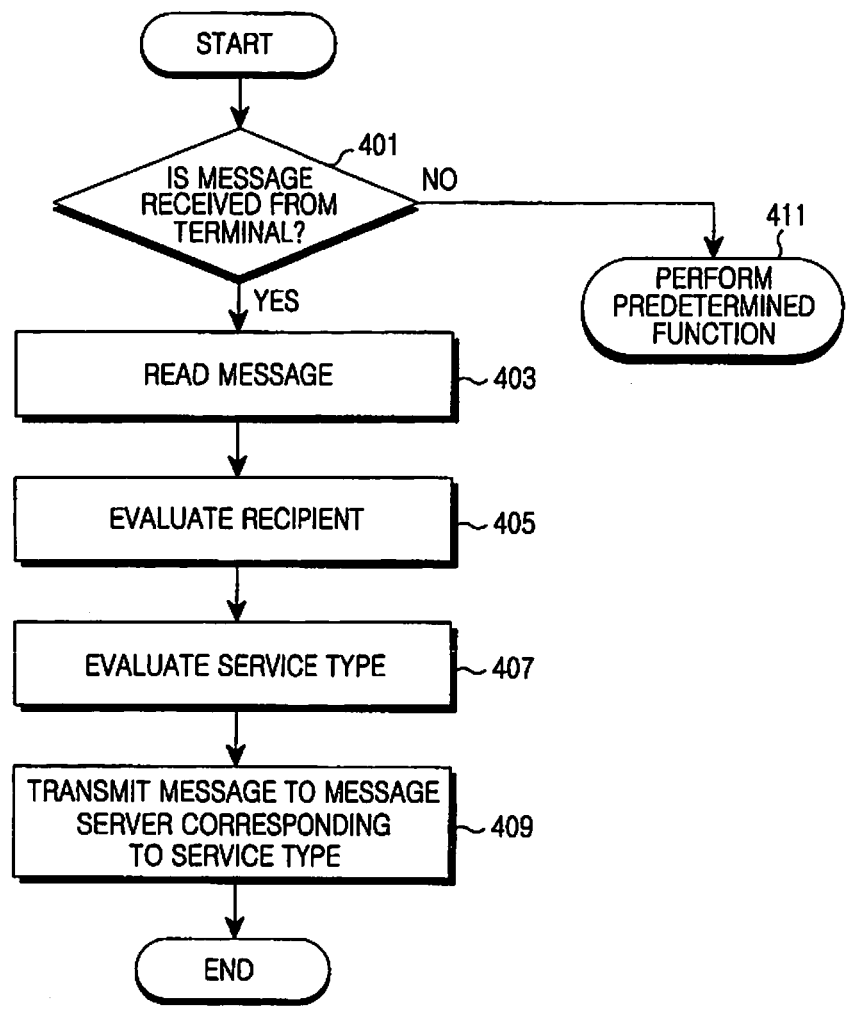
FIG. 4 illustrates a process of operating a service server for providing a message service according to the present invention.

FIG. 4 illustrates a process of operating a service server for providing a message service according to the present invention. Herein, the service server denotes a message server that transmits to a data-service dedicated terminal a message transmitted from a voice-service dedicated terminal.

Referring to FIG. 4, the controller 222 of the service server 220 determines whether a message transmitted by the mobile terminal 200 is received in step 401.

If the message is not received from the mobile terminal 200, the controller 222 performs a predetermined function (e.g., a standby mode) in step 411.

Otherwise, if the message is received from the mobile terminal 200, the controller 222 controls the message reader 226 to read the received message in step 403.

Under the control of the controller 222, the message reader 226 evaluates recipient's identification information included in the received message in step 405. Then, the message reader 226 evaluates a service type of a message to be transmitted to the receiving-side terminal in step 407.

Under the control of the controller 222, the message reader 226 may recognize the recipient's identification information by using a user identification (e.g., an NAI) of the receiving-side terminal (i.e., the data-service dedicated terminal). Then, the message reader 226 may obtain service type information by evaluating a word (e.g., a first word followed by the user identification) included in the message.

For example, if the message received from the mobile terminal 200 is "tgajh79@sms.wimax", the message reader 226 may determine that a receiving-side user identification is "tgajh79" and a message to be transmitted to the receiving-side user is an SMS message.

In the same manner, if the received message is "tgajh79@mms.wimax", the message reader 226 may determine that a receiving-side user identification is "tgajh79" and a message to be transmitted to the receiving-side user is an MMS message.

In step 409, the controller 222 selects a message server for providing a message service corresponding to the service type evaluated in step 407, and controls the selected message server to provide the message to the receiving-side terminal.

For example, if the received message is "tgajh79@sms.wimax", the controller 222 transmits the message to the SMS server 107 for processing the received message, and if the received message is "tgajh79@mms.wimax", the controller 222 transmits the message to the MMS server 106 for processing the received message.

Thereafter, the procedure of FIG. 4 ends.

According to the preferred embodiments of the present invention, a message is generated using a unique identification of a user of a voice-service dedicated terminal and is transmitted to a service server. The service server receives the message and evaluates user identification information of a receiving-side terminal and service type information included in the message. Then, the service server transmits the message to a corresponding message processing server.

Therefore, a problem can be solved in which a message cannot be transmitted to a data-service dedicated terminal in a conventional voice-service dedicated terminal.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for operating a voice-service terminal using a voice-service dedicated network, the method comprising:
    generating a message to be transmitted to a data-service terminal using a data-service dedicated network, wherein the message includes an identification of the data-service terminal, a service type of the message, and a network type of the data-service dedicated network; and
    transmitting the message to a service server through a voice-service network,
    wherein the network type comprises at least one of a Worldwide interoperability for Microwave Access (Wi-MAX) network, an EVolution Data Only (EVDO) network, and a Long Term Evolution (LTE) network,
    wherein the service type of the message comprises at least one of a Short Message Service, a Multimedia Message Service, a voice message service and an e-mail service, and
    wherein the message is formatted as 'the identification'@'the service type'.'the network type'.

2. The method of claim 1, wherein the voice-service network comprises at least one of a 2nd Generation network, a 3rd Generation network, and a Wideband Code Division Multiple Access (WCDMA) network.

3. The method of claim 1, wherein the identification of the data-service dedicated terminal includes a Network Address Identification (NAI).

4. A method for operating a service server, the method comprising:
    receiving, from a voice-service terminal using a voice-service dedicated network through the voice-service dedicated network, a message including an identification of a data-service terminal using a data-service dedicated network, a service type of the message, and a network type of the data-service dedicated network; and
    transmitting, to the data-service terminal indicated by the identification, the message through a message processing server corresponding to the service type and the data-service dedicated network indicated by the network type,
    wherein the network type comprises at least one of a Worldwide interoperability for Microwave Access (Wi-MAX) network, an EVolution Data Only (EVDO) network, and a Long Term Evolution (LTE) network,
    wherein the service type of the message comprises at least one of a Short Message Service, a Multimedia Message Service, a voice message service and an e-mail service, and
    wherein the message is formatted as 'the identification'@'the service type'.'the network type'.

5. The method of claim 4, wherein the voice-service network comprises at least one of a 2nd Generation network, a 3rd Generation network, and a Wideband Code Division Multiple Access (WCDMA) network.

6. The method of claim 4, wherein the identification of the data-service dedicated terminal includes a Network Address Identification.

7. An apparatus for a voice-service terminal using a voice-service dedicated network, the apparatus comprising:
    a message generator for generating a message to be transmitted to a data-service terminal using a data-service dedicated network, wherein the message includes an identification of the data-service terminal, a service type of the message, and a network type of the data-service dedicated network; and
    a communication unit for transmitting the message to a service server through a voice-service network,
    wherein the network type comprises at least one of a Worldwide interoperability for Microwave Access (Wi- MAX) network, an EVolution Data Only (EVDO) network, and a Long Term Evolution (LTE) network, wherein the service type of the message comprises at least one of a Short Message Service, a Multimedia Message Service, a voice message service and an e-mail service, and wherein the message is formatted as 'the identification'@'the service type'.'the network type'.

8. The apparatus of claim 7, wherein the voice-service network comprises at least one of a 2nd Generation network, a 3rd Generation network, and a Wideband Code Division Multiple Access (WCDMA) network.

9. The apparatus of claim 7, wherein the message generator uses a Network Address Identification (NAI) as the identification of the data-service dedicated terminal.

10. An apparatus for a service server, the apparatus comprising:

a communication unit for receiving, from a voice-service terminal using a voice-service dedicated network, through the voice-service dedicated network, a message including an identification of a data-service terminal using a data-service dedicated network, a service type of the message, and a network type of the data-service dedicated network; and a controller for controlling to transmit, to the data-service terminal indicated by the identification, the message through a message processing server corresponding to the service type and the data-service dedicated network indicated by the network type, wherein the network type comprises at least one of a Worldwide interoperability for Microwave Access (Wi-MAX) network, an EVolution Data Only (EVDO) network, and a Long Term Evolution (LTE) network, wherein the service type of the message comprises at least one of a Short Message Service, a Multimedia Message Service, a voice message service and an e-mail service, and wherein the message is formatted as 'the identification'@'the service type'.'the network type'.

11. The apparatus of claim 10, wherein the voice-service network comprises at least one of a 2nd Generation network, a 3rd Generation network, and a Wideband Code Division Multiple Access (WCDMA) network.

12. The apparatus of claim 10, wherein the message reader evaluates the identification of the data-service dedicated terminal by using a Network Address Identification.

* * * * *